US012807088B2

(12) United States Patent
Eisenbarth

(10) Patent No.: US 12,807,088 B2
(45) Date of Patent: Nov. 24, 2026

(54) REAR PROTECTION ROD FOR PROTECTING AN ELECTRIC MACHINE

(71) Applicant: Volvo Truck Corporation, Gothenburg (SE)

(72) Inventor: Mark Eisenbarth, Summerfield, NC (US)

(73) Assignee: Volvo Truck Corporation, Gothenburg (SE)

( * ) Notice: Subject to any disclaimer, the term of this patent is extended or adjusted under 35 U.S.C. 154(b) by 308 days.

(21) Appl. No.: 18/650,190

(22) Filed: Apr. 30, 2024

(65) Prior Publication Data

US 2024/0367722 A1 Nov. 7, 2024

(30) Foreign Application Priority Data

May 3, 2023 (EP) .................................... 23171354

(51) Int. Cl.

*B60R 19/56* (2006.01)
*B60G 11/27* (2006.01)
*B60K 1/00* (2006.01)
*B62D 21/15* (2006.01)

(52) U.S. Cl.

CPC .............. *B60R 19/56* (2013.01); *B60G 11/27* (2013.01); *B60K 1/00* (2013.01); *B62D 21/152* (2013.01); *B62D 21/155* (2013.01); *B60G 2202/152* (2013.01)

(58) Field of Classification Search

CPC ..................................................... B60R 19/56
See application file for complete search history.

(56) References Cited

U.S. PATENT DOCUMENTS

| | | | | |
|---|---|---|---|---|
| 3,923,330 A * | 12/1975 | Viall, Sr. | B60R 19/56 293/118 |
| 6,345,587 B1 * | 2/2002 | Toscano | B60Q 1/484 116/30 |
| 7,434,821 B2 * | 10/2008 | Hinz | B60G 11/27 280/43 |
| 8,657,336 B1 * | 2/2014 | Atra | B60R 19/56 280/157 |
| 2019/0225173 A1 | 7/2019 | Byrne | |

FOREIGN PATENT DOCUMENTS

| | | |
|---|---|---|
| CN | 206579409 U | 10/2017 |
| CN | 208646576 U | 3/2019 |
| CN | 208978609 U | 6/2019 |
| CN | 210126397 U | 3/2020 |

OTHER PUBLICATIONS

Extended European Search Report for European Patent Application No. 23171354.6, mailed Oct. 30, 2023, 7 pages.
Examination Report for European Patent Application No. 23171354.6, mailed Jun. 12, 2026, 4 pages.

* cited by examiner

*Primary Examiner* — Nicholas McFall
(74) *Attorney, Agent, or Firm* — Withrow & Terranova, PLLC

(57) ABSTRACT

A rear protection rod for a vehicle. The rear protection rod comprises a first end and a second end. The rear protection rod is arranged to be attached between a left side and a right side of the vehicle behind and/or below an electric machine mounted on a rear end part of the vehicle. The first end is arranged to be attached to the left side with a first resilient member and the second end is arranged to be attached to the right side with a second resilient member such that the electric machine is protected from rear impacts.

20 Claims, 5 Drawing Sheets

REAR PROTECTION ROD FOR PROTECTING AN ELECTRIC MACHINE

PRIORITY APPLICATIONS

The present application claims priority to European Patent Application No. 23171354.6, filed on May 3, 2023, and entitled "REAR PROTECTION ROD FOR PROTECTING AN ELECTRIC MACHINE," which is incorporated herein by reference in its entirety.

TECHNICAL FIELD

The disclosure generally relates to a device for protecting an electric machine at a rear axle of a vehicle. In particular aspects, the disclosure relates to a rear protection rod for protecting an electric machine. The invention can be applied in heavy-duty vehicles, such as trucks, buses and construction equipment. Although the invention will be described with respect to a truck, the invention is not restricted to this particular vehicle, but may also be used in other vehicles such as busses or construction vehicles, e.g. articulated haulers or backhoe loaders.

BACKGROUND

Trucks are in several markets provided with a rear underrun protection bar, which often is a legal requirement. The rear underrun protection prohibits a smaller vehicle such as a car or a motorcycle to be lodged under the truck at e.g. an accident where the smaller vehicle runs into the truck. The rear underrun protection bar will also protect the rear installation of the truck, e.g. when the truck reverses at a loading dock or similar locations. A rear underrun protection bar is fixedly attached to the frame of the truck, and may be either rigid, foldable or slidable.

A folding rear underrun protection bar can be folded away to give better reach to a coupling. A sliding rear underrun protection bar can be used to increase space at the rear of the truck, e.g. for a tipper truck. Still, a rear underrun protection bar may be in the way at construction sites where the ground is not flat and where the truck may have to reverse into piles of gravel or sand. Further, the rear underrun protection bar is mainly intended to protect vehicles from getting lodged under the truck, and not to protect installations on the truck.

There are for this reason occasions where a rear underrun protection bar will not protect an installation on the truck. There is thus a need for additional rear protection for a vehicle.

SUMMARY

According to a first aspect of the disclosure, a rear protection rod for a vehicle comprises a first end and a second end. The rear protection rod is arranged to be attached between a left side and a right side of the vehicle behind and/or below an electric machine mounted on a rear end part of the vehicle. The first end is arranged to be attached to the left side of the vehicle with a first resilient member and the second end is arranged to be attached to the right side of the vehicle with a second resilient member such that the electric machine is protected from rear impacts. The first aspect of the disclosure may seek to protect equipment mounted low at the rear of a vehicle from being damaged by accidental impacts from other vehicles or from impacts when backing up while at the same time not impairing the natural movements of the vehicle. A technical benefit may include that a rear protection rod attached with resilient members will be allowed to move laterally (side-to-side) when the vehicle moves. The rear protection rod will thereby not provide unwanted stiffening of a frame, a suspension or an axle of the vehicle but can be allowed to move relative the vehicle while still providing rear impact protection.

In some examples, including in at least one preferred example, optionally the rear protection rod may be arranged to be attached between a left suspension and a right suspension of a suspension system of the vehicle. A technical benefit may include being able to mount the rear protection rod at a low position of the vehicle, such that it can be mounted below e.g. an electric machine arranged on the rear axle of the vehicle. The rear protection rod will in this way be able to protect the electric machine towards the ground. The rear protection rod can also be mounted behind the electric machine and will in this way protect the electric machine from behind. Mounting the rear protection rod to wheel suspension brackets allows for a more appropriate installation when compared to rear protection rods mounted to the frame of the vehicle.

In some examples, including in at least one preferred example, optionally the rear protection rod may be arranged to be attached between a left part of a rear axle and a right part of a rear axle of the vehicle. A technical benefit may include being able to mount the rear protection rod at a different position of the vehicle. This can be beneficial if the truck design does not allow for mounting directly on the suspension system.

In some examples, including in at least one preferred example, optionally the rear protection rod may be arranged to be attached between a left part of a frame of the vehicle and a right part of the frame of the vehicle. A technical benefit may include being able to mount the rear protection rod at a different position of the vehicle. This can be beneficial if the truck design does not allow for mounting directly on the suspension system or on the axle of the truck.

In some examples, including in at least one preferred example, optionally the first resilient member and the second resilient member may be a damping element like a rubber bushing. A technical benefit may include that the attachments of the rear protection rod to the vehicle is flexible, thereby providing movement of the rear protection rod.

In some examples, including in at least one preferred example, optionally the dampening of the rubber bushings is adjustable. A technical benefit may include that the damping of the rubber bushings may be adapted to various driving conditions where the rear protection rod may need to move different distances.

In some examples, including in at least one preferred example, optionally the first resilient member and the second resilient member may comprise a damping element like a ball joint. A technical benefit may include that using ball joints can provide increased flexibility of the rear protection rod.

In some examples, including in at least one preferred example, optionally the rear protection rod may comprise a first rod member and a second rod member, where the first rod member is adapted to slide into the second rod member. A technical benefit may include that the rear protection rod can be mounted closer to the installation that needs protection. By using a rear protection rod that comprises a first rod member and a second rod member, where the first rod member is adapted to slide into the second rod member, i.e. a telescopic rear protection rod, the rear protection rod follow the natural movement of the vehicle, and the length of the rear protection rod will adapt to the movement of the vehicle.

In some examples, including in at least one preferred example, optionally the rear protection rod comprises a first rod member, a second rod member and a third rod member, where the first rod member and the third rod member are adapted to slide into the second rod member. A technical benefit may include that by increasing number of rod members that are adapted to slide into a further rod member, the rear protection rod can be made more adaptable to the vehicle's movements.

In some examples, including in at least one preferred example, optionally the rear protection rod is a telescopic protection rod. A technical benefit may include that a rear protection rod that provides the desired characteristics is cost-efficient and easy to maintain.

According to a second aspect of the disclosure, a vehicle comprises a rear protection rod according to the first aspect. The second aspect of the disclosure may seek to provide a vehicle where the risk of damage from rear impacts are reduced or removed. A technical benefit may include that the vehicle can be provided with sensitive equipment at the rear of the vehicle, such as an electric motor for driving a rear axle.

In some examples, including in at least one preferred example, optionally the vehicle comprises a rear axle provided with an electric machine mounted on the rear of the rear axle, where a suspension system is arranged between the rear axle and a frame of the vehicle, and where the rear protection rod may be mounted between the left suspension and the right suspension of the suspension system. A technical benefit may include being able to mount the rear protection rod at a low position of the vehicle, such that it can be mounted below e.g. an electric machine arranged on the rear axle of the vehicle. The rear protection rod will in this way be able to protect the electric machine towards the ground. The rear protection rod can also be mounted behind the electric machine and will in this way protect the electric machine from behind. Mounting the rear protection rod to wheel suspension brackets allows for a more appropriate installation when compared to rear protection rods mounted to the frame of the vehicle.

In some examples, including in at least one preferred example, optionally the vehicle comprises a rear axle provided with an electric machine mounted on the rear of the rear axle, where the rear protection rod may be mounted between a left part of the rear axle and a right part of the rear axle of the vehicle. A technical benefit may include being able to mount the rear protection rod at a different position of the vehicle. This can be beneficial if the truck design does not allow for mounting directly on the suspension system.

In some examples, including in at least one preferred example, optionally the vehicle comprises a rear axle provided with an electric machine mounted on the rear of the rear axle, where the rear protection rod may be mounted between a left part of a frame of the vehicle and a right part of the frame of the vehicle. A technical benefit may include being able to mount the rear protection rod at a different position of the vehicle. This can be beneficial if the truck design does not allow for mounting directly on the suspension system.

In some examples, including in at least one preferred example, optionally the rear protection rod may be arranged below the electric machine as a lower protection rod.

In some examples, including in at least one preferred example, optionally a second protection rod may be arranged behind the electric machine as a rear protection rod.

In some examples, including in at least one preferred example, optionally the vehicle comprises a protection plate mounted on the lower protection rod and the rear protection rod.

In some examples, including in at least one preferred example, optionally the suspension system may be an air suspension comprising air bellows.

In some examples, including in at least one preferred example, optionally the lower protection rod and the rear protection rod are mounted to air bellow brackets of the suspension system.

In some examples, including in at least one preferred example, optionally the vehicle is a truck, bus or construction vehicle.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

In the drawings.

DETAILED DESCRIPTION

Figure 1:
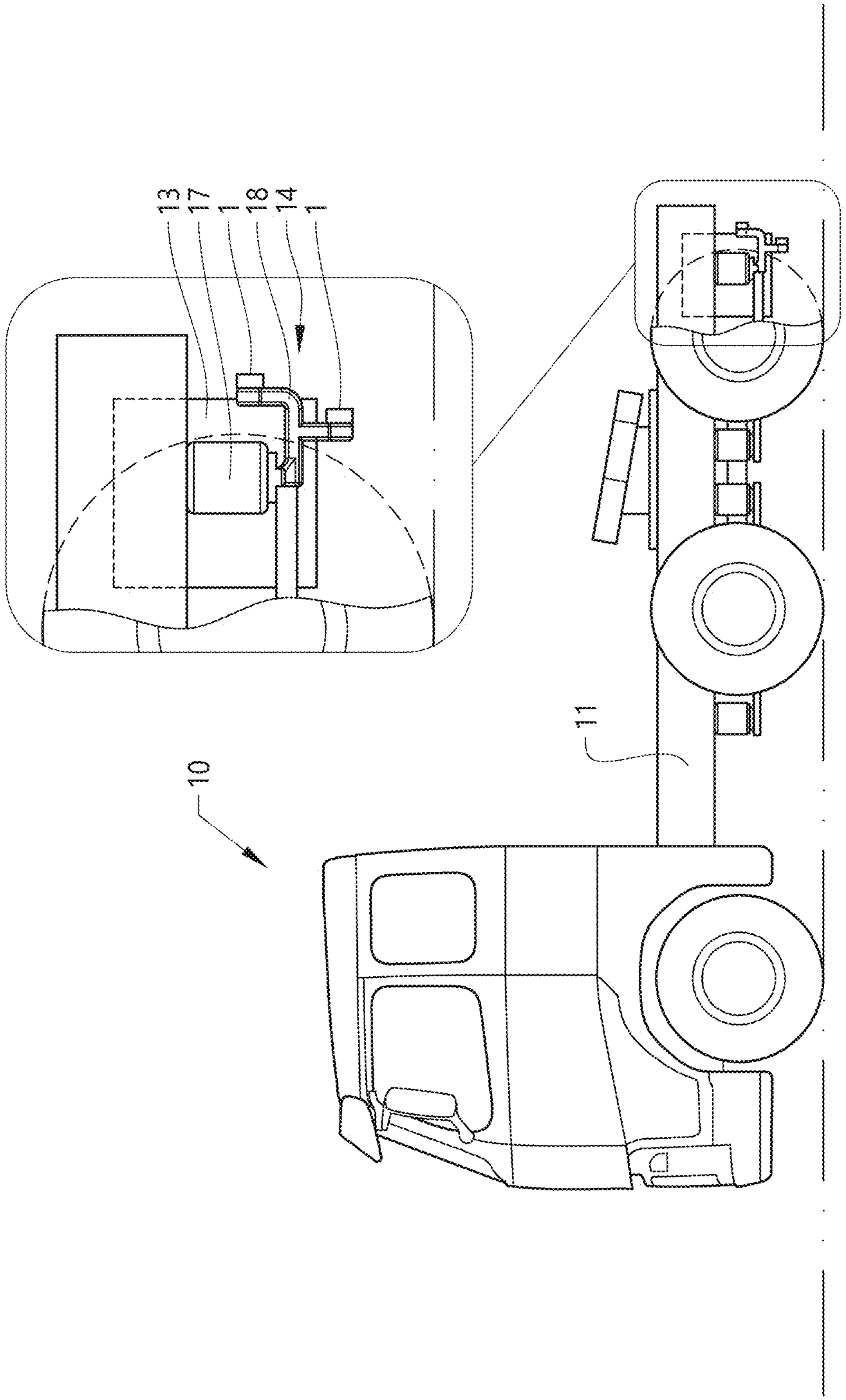
FIG. 1 shows a schematic side view of a vehicle comprising a rear protection rod according to first aspect of the disclosure.

The detailed description set forth below provides information and examples of the disclosed technology with sufficient detail to enable those skilled in the art to practice the disclosure.

FIGS. 1 to 7 show a schematic vehicle 10 provided with a rear protection rod 1 arranged at the rear of the vehicle. The shown vehicle is a tractor unit having a single front axle, two rear axles and a fifth wheel, but the rear protection rod 1 can be mounted to any type of heavy vehicle, such as trucks, busses and working machines, such as tipper trucks or articulated haulers. In the described example, a truck is used as an example of a vehicle provided with a rear protection rod 1. The shown truck is provided with a suspension system 14 arranged between the frame 11 and the wheel axles comprising a left suspension 15 and a right suspension 16. The shown suspension system is an air suspension provided with air bellows 17, such that the wheels are suspended and can be adjusted in height. The upper part of an air bellow is attached to the frame, the lower part of an air bellow is attached to the wheel suspension with an air bellow bracket 18. The truck may be provided with one or more rear protection rods, depending on e.g. the size and position of the electric machine. In the shown example, two rear protection rods are used.

In the shown example, the truck is provided with a rear axle 12 where an electric machine 13 is mounted to the rear axle. The electric machine is mounted on a rear end of the vehicle. In the example shown, the electric machine is mounted at the rear side of the rear axle, behind the rear axle, such that it extends rearwards from the rear axle. The electric machine can function as an electric motor that can propel or help to propel the truck, and can function as a generator regenerating electricity when the truck decelerates. There may be several reasons that the electric machine is mounted at the rear of the rear axle. One reason may be that the truck is a hybrid truck and the rear axle is also powered by a propeller shaft running from a combustion engine arranged at the front of the truck. Another reason may be space constraints between the axles or in front of a single rear axle. Another reason may be weight distribution.

Regardless of the reason for mounting the electric machine at the rear end of the vehicle, the electric machine is positioned in a position where it may be exposed to damage, especially when the truck reverses and drives backwards. Due to the size of the electric machine, the electric machine may be positioned relatively close to the ground with a limited ground clearance, which increases the risk of the electric machine being damaged. The electric machine may also extend further to the rear than the rear wheel and the wheel suspension, leaving the electric machine completely exposed. Even if the truck is provided with a rear underrun protection bar, the electric machine may protrude below the rear underrun protection bar. Previously, the primary purpose of a rear underrun protection bar has not been to protect specific components of the vehicle, but to prevent intrusion of lighter vehicles. Today, with the increase of electrification also on heavy vehicles, electric machines are becoming more commonplace. On heavy vehicles that previously may not have had a need for a rear underrun protection bar, the electric machine may be completely unprotected if such is not added.

To protect the electric machine, the truck is provided with one or more rear protection rods 1 such that the electric machine 13 is protected from rear impacts. In the shown example, the truck is provided with two rear protection rods, in FIGS. 3-7 being referred to as a first protection rod 19 and a second protection rod 20. The first protection rod 19 is arranged behind the electric machine 13 and will protect the electric machine from impacts from behind when the truck is reversing. The second protection rod 20 is arranged below the electric machine and will protect the electric machine from lower impacts, e.g. when the ground is uneven or when the truck risks reversing into a curb or the like. The relative positions of the first protection rod 19 and second protection rod 20 lengthwise and heightwise relative each other can be adapted depending on the size of the electric machine 13.

It is possible to have only one protection rod 1 placed at a suitable distance from the ground based on the type of vehicle and the distance between the electric machine and the ground and/or the rear end of the vehicle respectively. The size of the electric machine is intended as an illustrative, non-limiting example.

The rear protection rod 1 is in one example a solid metal rod provided with a resilient member at each end of the rear protection rod 1. The rear protection rod 1 comprises a first resilient member 4 arranged at a first end 2 of the rear protection rod, and a second resilient member 5 arranged at a second end 3 of the rear protection rod. The resilient member allows the rear protection rod 1 to move a distance side-to-side in relation to the attachment point of the suspension system 14 of the truck. Since the left suspension 15 of the suspension system will move differently than the right suspension 16 of the suspension system when the truck drives on an uneven road, it is of advantage to attach the rear protection rod 1 with resilient members. The resilient member may e.g. be a rubber bushing and may also or alternatively comprise a ball joint. The resiliency of the resilient member can be adapted to achieve the desired movement range of the rear protection rod 1.

Figure 2:
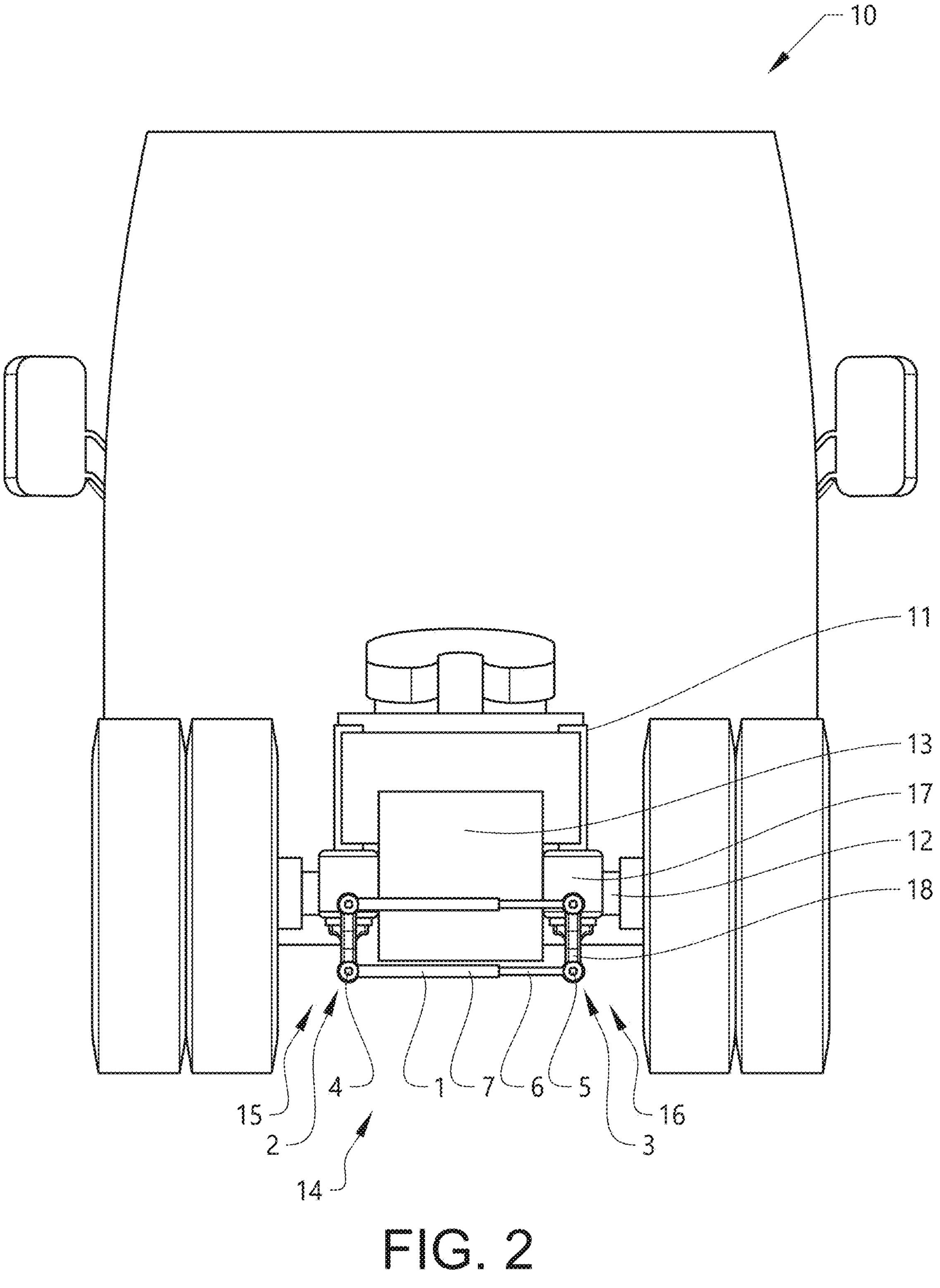
FIG. 2 shows a schematic rear view of a vehicle according to first aspect of the disclosure.
Figure 3:
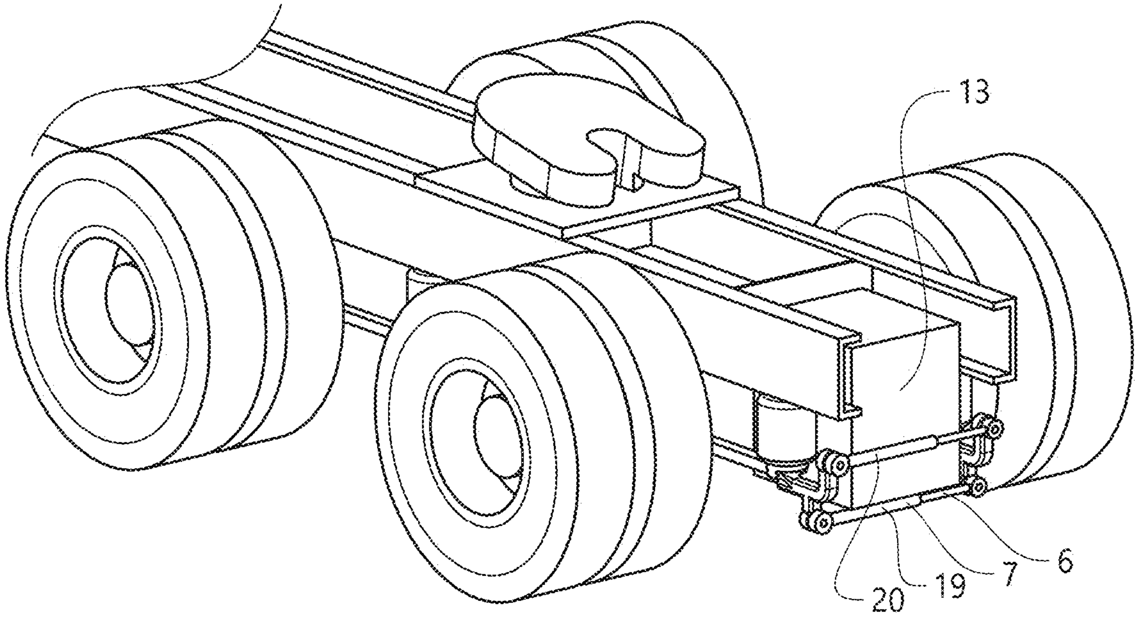
FIG. 3 shows an example of rear protection rods mounted to a vehicle according to further aspects of the disclosure.

FIGS. 2-3 show an example of a rear protection rod 1 where the rear protection rod 1 comprises a first rod member 6 and a second rod member 7. This makes the rear protection rod 1 a telescopic protection rod. To allow for more individual movement of the left and right suspensions of the suspension system, the rear protection rod may be telescopic. A stiff rear protection rod attached to the suspension system without any resilience would prevent the left and right suspensions to move freely. The first rod member 6 is arranged to slide into the second rod member 7, such that the distance between the first resilient member 4 and the second resilient member 5 can vary allowing for larger movements of the suspension system when the truck drives on uneven roads without the rear protection rod restricting the movement. Alternatively, the rear protection rod 1 can be arranged on the truck with a lower resiliency than for a rod without a first rod member 6 and a second rod member 7. This reduces the stress on the resilient members 4, 5 that otherwise could be damaged or won out too quickly if the truck was only equipped with a solid rear protection rod attached to resilient members when working regularly on uneven roads. In the shown example, the first rod member 6 and the second rod member 7 are circular, but other shapes are possible. The second rod member 7 is hollow such that it can accommodate the first rod member 6. A circular shape may be of advantage since the first rod member 6 and the second rod member 7 can rotate relative each other, which minimizes the stress put on the resilient members 4, 5. Other telescopic solutions are also possible, such as flat bars held together with rivets or brackets. The rear protection rod is in the shown example attached to air bellow brackets 18 of the suspension system.

Figure 4:
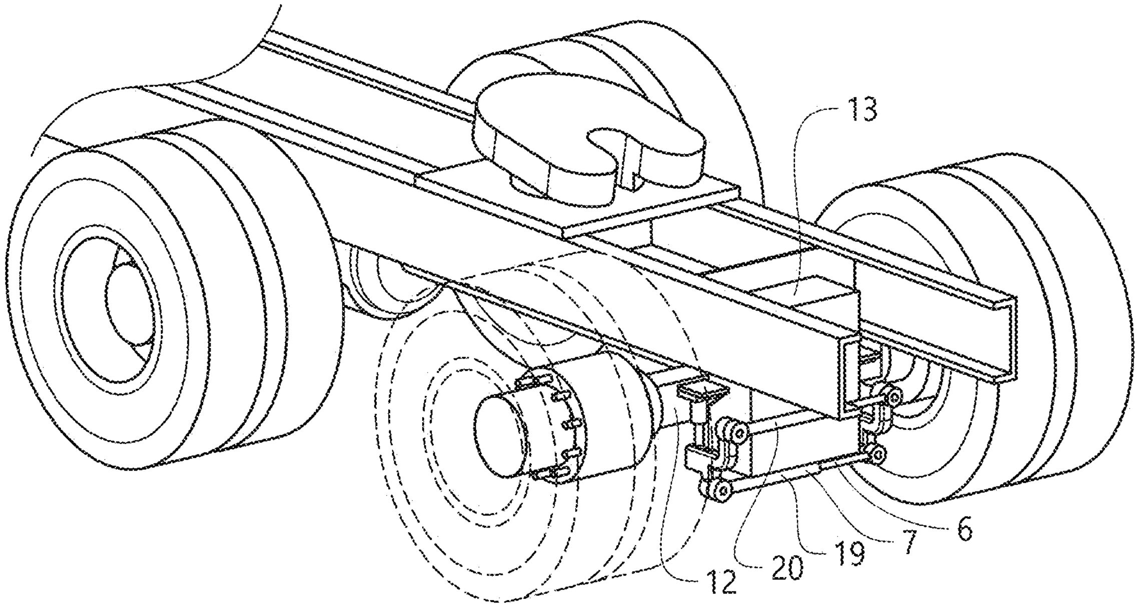
FIG. 4 shows an example of rear protection rods mounted to a vehicle according to further aspects of the disclosure.

FIG. 4 shows an alternative attachment for the rear protection rod 1. In FIG. 4, the first and second protection rods 19, 20 are arranged to be attached between a left part of the rear axle 12 and a right part of the rear axle 12 of the vehicle 10 in order to protect the electric machine 13.

Figure 5:
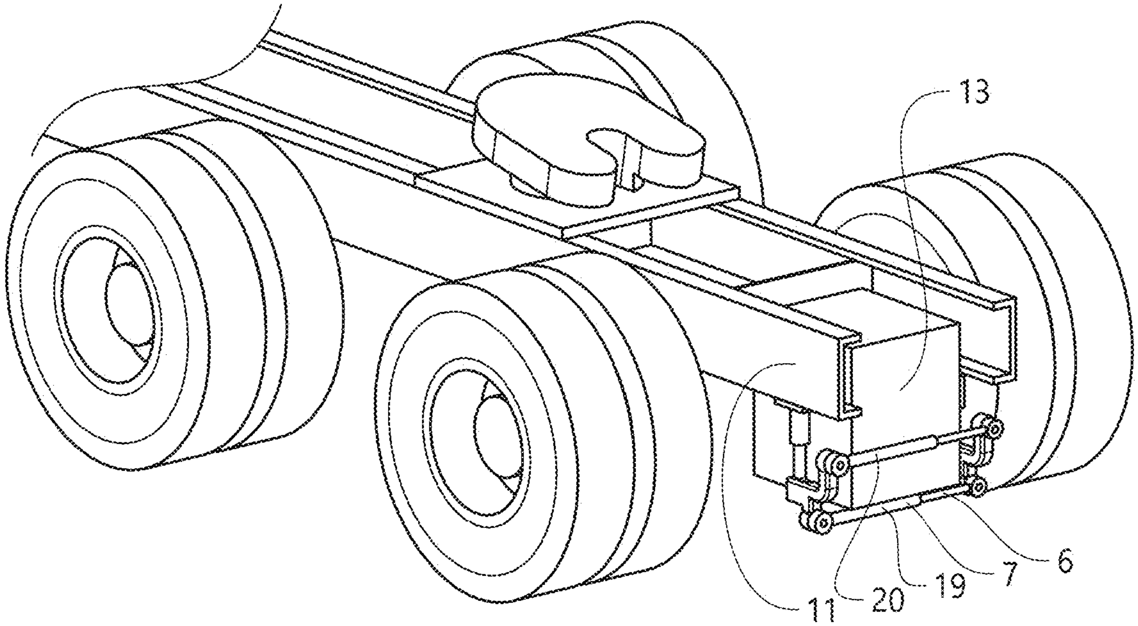
FIG. 5 shows an example of rear protection rods mounted to a vehicle according to further aspects of the disclosure.

FIG. 5 shows a further alternative attachment for the rear protection rod 1. In FIG. 5, the first and second protection rods 19, 20 are arranged to be attached between a left part of a frame 11 of the vehicle 10 and a right part of the frame of the vehicle 10 in order to protect the electric machine 13.

Figure 6:
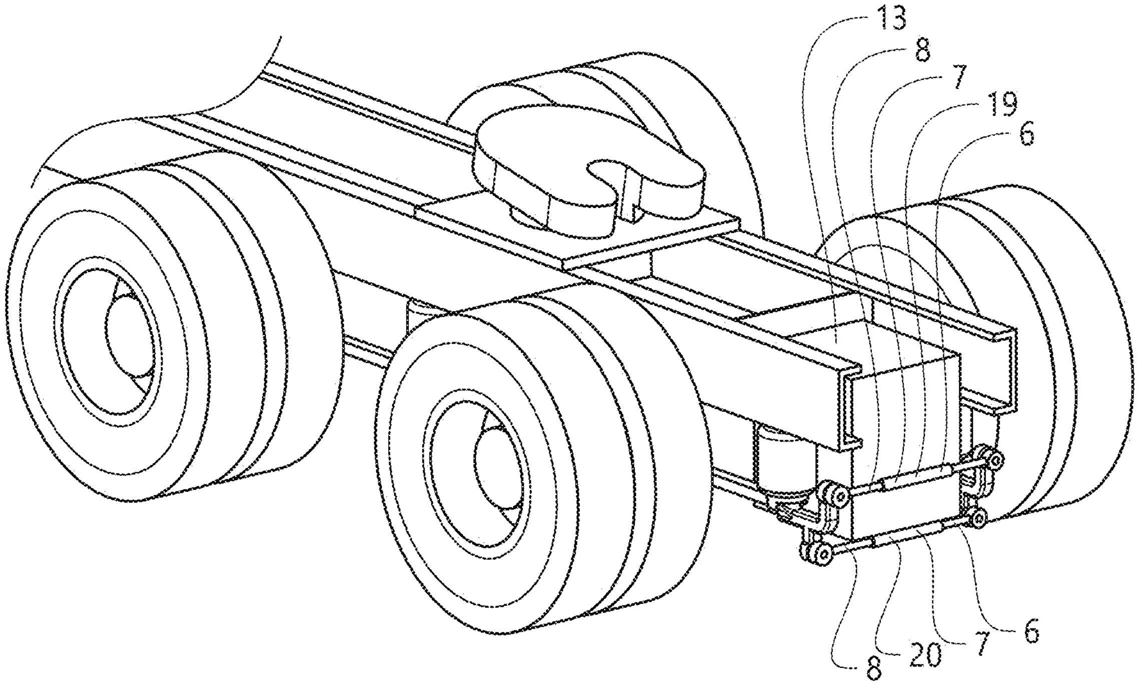
FIG. 6 shows a further example of rear protection rods mounted to a vehicle according to further aspects of the disclosure.

FIG. 6 shows another example of a rear protection rod 1 comprising three rod members arranged to move telescopically relative each other. Here, the rear protection rod 1 is provided with a first rod member 6, a second rod member 7 and a third rod member 8, where the first rod member 6 and the third rod member 8 are arranged to slide into the second rod member 7.

Figure 7:
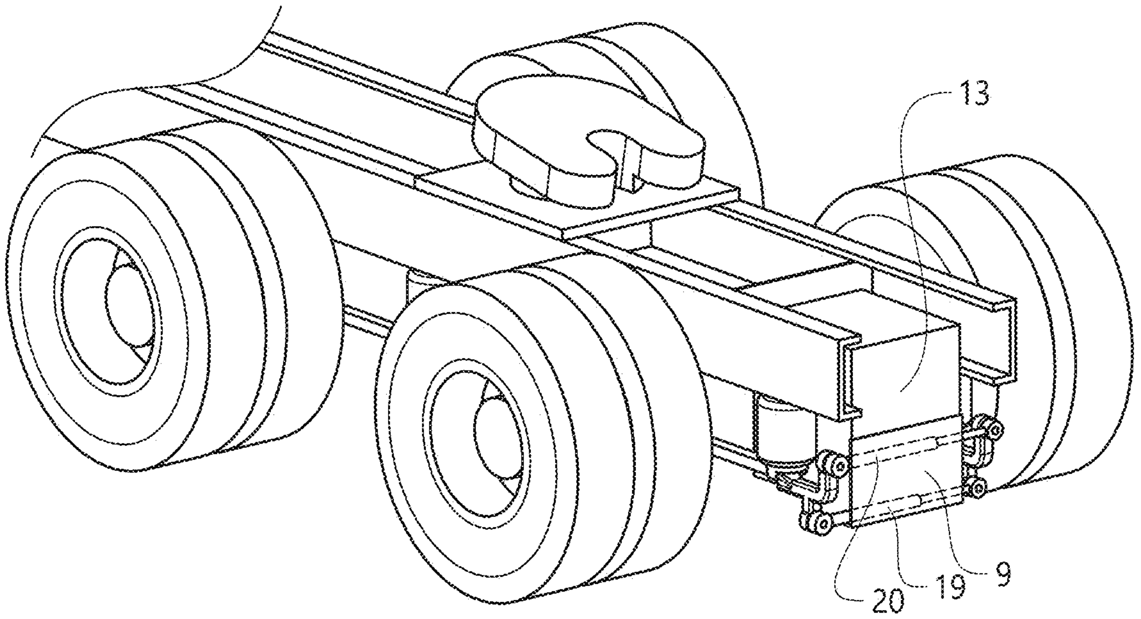
FIG. 7 shows an example of a protection plate according to a further aspect of the disclosure.

It is also possible to attach a protection plate 9 to the first and second protection rods 19, 20, as shown in FIG. 7. The protection plate 9 may extend behind and below the complete electric machine, or over specific parts of the electric machine. The protection plate is preferably attached to the second rod member, such that it does not interfere with the telescopic function of the rear protection rod.

It is to be understood that the present invention is not limited to the embodiments described above and illustrated in the drawings; rather, the skilled person will recognize that many changes and modifications may be made within the scope of the appended claims. For instance, in FIGS. 3-7, the first and second protection rods 19 and 20 are arranged to be attached at the same location on the vehicle, e.g. both protection rods are attached to the suspension system in FIG. 3. The first protection rod 19 and the second protection rod 20 could be arranged to be attached to different parts of the vehicle 10, e.g. the first protection rod 19 could be arranged to be attached to the frame 11 and the second protection rod 20 could be arranged to be attached to the rear axle 12.

Example 1: A rear protection rod according to the first aspect of the disclosure, wherein the dampening of the rubber bushings can be adjustable.

Example 2: A vehicle according to the second aspect of the disclosure, wherein the vehicle is a truck, bus or construction vehicle.

Example 3: A rear protection rod according to the first aspect of the disclosure, wherein the rear protection rod is a telescopic protection rod.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A vehicle comprising a rear protection rod comprising:

a first end; and a second end;

wherein the rear protection rod is arranged to be attached between a left side and a right side of the vehicle behind and/or below an electric machine mounted on a rear end part of the vehicle;

wherein the first end is arranged to be attached to the left side with a first resilient member;

wherein the second end is arranged to be attached to the right side with a second resilient member such that the electric machine is protected from rear impacts;

wherein the vehicle comprises a rear axle provided with the electric machine mounted on the rear of the rear axle, where a suspension system is arranged between the rear axle and a frame of the vehicle, and where the rear protection rod is mounted between a left suspension and a right suspension of the suspension system.

2. The rear protection rod of claim 1, wherein each of the first resilient member and the second resilient member is a damping element.

3. The rear protection rod of claim 1, wherein the rear protection rod comprises a first rod member and a second rod member, where the first rod member is adapted to slide into the second rod member.

4. The rear protection rod of claim 1, wherein the rear protection rod comprises a first rod member, a second rod member, and a third rod member, where the first rod member and the third rod member are adapted to slide into the second rod member.

5. The vehicle of claim 1, wherein the suspension system is an air suspension comprising air bellows.

6. The vehicle of claim 5, wherein a lower protection rod and one rear protection rod are mounted to air bellow brackets of the suspension system.

7. The vehicle of claim 1, wherein the rear protection rod is arranged below the electric machine as a lower protection rod.

8. The vehicle of claim 7, wherein a second protection rod is arranged behind the electric machine as a rear protection rod.

9. A vehicle comprising a rear protection rod comprising:

a first end; and a second end;

wherein the rear protection rod is arranged to be attached between a left side and a right side of the vehicle behind and/or below an electric machine mounted on a rear end part of the vehicle;

wherein the first end is arranged to be attached to the left side with a first resilient member; and wherein the second end is arranged to be attached to the right side with a second resilient member such that the electric machine is protected from rear impacts;

wherein the vehicle comprises a rear axle provided with the electric machine mounted on the rear of the rear axle, where the rear protection rod is mounted between a left part of the rear axle and a right part of the rear axle of the vehicle.

10. The vehicle of claim 9, wherein the rear protection rod is arranged below the electric machine as a lower protection rod.

11. The vehicle of claim 10, wherein a second protection rod is arranged behind the electric machine as a rear protection rod.

12. The rear protection rod of claim 9, wherein each of the first resilient member and the second resilient member is a damping element like a rubber bushing and/or a ball joint.

13. The rear protection rod of claim 9, wherein the rear protection rod comprises a first rod member and a second rod member, where the first rod member is adapted to slide into the second rod member.

14. The rear protection rod of claim 9, wherein the rear protection rod comprises a first rod member, a second rod member, and a third rod member, where the first rod member and the third rod member are adapted to slide into the second rod member.

15. A vehicle comprising a rear protection rod comprising:

a first end; and a second end;

wherein the rear protection rod is arranged to be attached between a left side and a right side of the vehicle behind and/or below an electric machine mounted on a rear end part of the vehicle;

wherein the first end is arranged to be attached to the left side with a first resilient member; and wherein the second end is arranged to be attached to the right side with a second resilient member such that the electric machine is protected from rear impacts;

wherein the vehicle comprises a rear axle provided with the electric machine mounted on the rear of the rear axle, where the rear protection rod is mounted between a left part of a frame of the vehicle and a right part of the frame of the vehicle.

16. The vehicle of claim 15, wherein the rear protection rod is arranged below the electric machine as a lower protection rod.

17. The vehicle of claim 15, wherein a second protection rod is arranged behind the electric machine as a rear protection rod.

18. The rear protection rod of claim 15, wherein each of the first resilient member and the second resilient member is a damping element like a rubber bushing and/or a ball joint.

19. The rear protection rod of claim 15, wherein the rear protection rod comprises a first rod member and a second rod member, where the first rod member is adapted to slide into the second rod member.

20. The rear protection rod of claim 15, wherein the rear protection rod comprises a first rod member, a second rod member, and a third rod member, where the first rod member and the third rod member are adapted to slide into the second rod member.

* * * * *